United States Patent [19]

Erwin et al.

[11] 4,350,301

[45] Sep. 21, 1982

[54] FLOW CONTROLLED PRESSURE REGULATING DEVICE

[75] Inventors: Louis R. Erwin, Livonia; Granville W. Hurlong, Jr., Southfield, both of Mich.

[73] Assignee: The Bendix Corporation, Southfield, Mich.

[21] Appl. No.: 162,985

[22] Filed: Jun. 25, 1980

[51] Int. Cl.³ .................. B05B 1/32; F02M 61/08
[52] U.S. Cl. .................. 239/453; 239/533.7; 239/584
[58] Field of Search .......... 239/88, 89, 91, 95, 239/96, 453, 533.3–533.9, 533.12, 584; 137/479, 484.2, 484.4, 494, 497, 498, 500, 505, 505.14, 505.15, 514.7

[56] References Cited

U.S. PATENT DOCUMENTS

| | | | |
|---|---|---|---|
| 2,307,949 | 1/1943 | Phillips | 137/498 |
| 2,351,035 | 6/1944 | Grant et al. | 137/498 |
| 2,975,982 | 3/1961 | Dahl | 239/584 X |
| 3,379,374 | 4/1968 | Mekkes | 239/533.7 X |
| 3,444,886 | 5/1969 | Bailey et al. | 239/533.7 X |
| 4,034,917 | 7/1977 | Bailey | 239/453 |
| 4,181,144 | 1/1980 | Landen | 239/453 X |

*Primary Examiner*—Johnny D. Cherry
*Attorney, Agent, or Firm*—Markell Seitzman; Russel C. Wells

[57] ABSTRACT

A pressure regulating nozzle that may be incorporated within a fluid supplying device such as a fuel injector. The nozzle or spray tip comprises a reciprocating piston adapted to move a plunger which is slidably located within an outlet bore. The piston further contains a plurality of control orifices located within a bottom portion to provide a controlled pressure drop thereacross to regulate the pressure within the nozzle at a relatively constant value. The nozzle further includes a series orifice, located between the piston and the fluid supply for isolating the piston from upstream pressure surges and to develop rate feedback forces to damp the motion of the piston. In one embodiment of the invention the spray tip includes a plurality of outlet orifices located in fluid communication with the outlet bore wherein the open area of the outlet orifices is modulated by the movement of the plunger in response to the reciprocating motion of the piston. A further embodiment illustrates a by-pass pressure regulator incorporating featues of the present invention.

25 Claims, 7 Drawing Figures

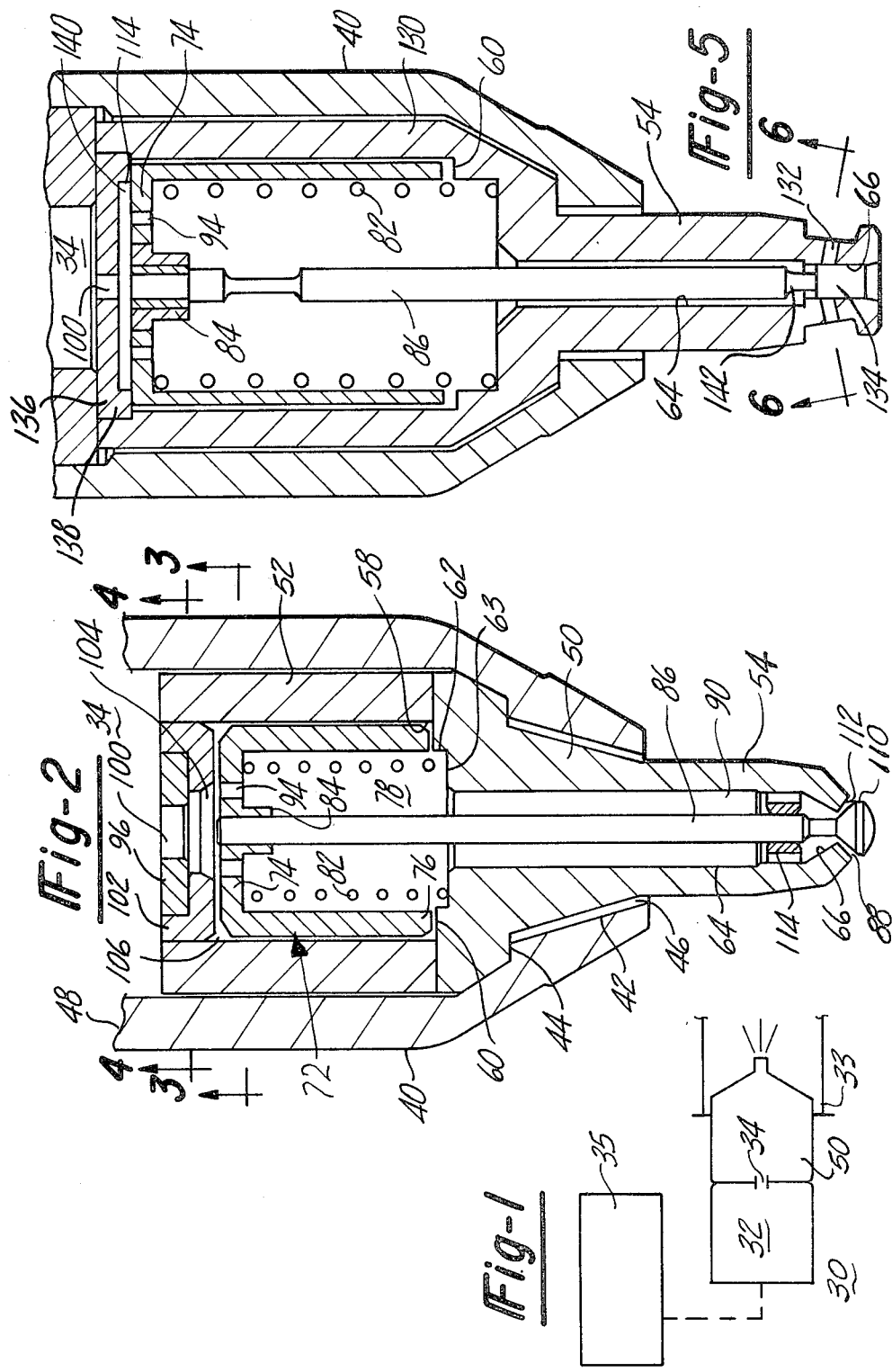

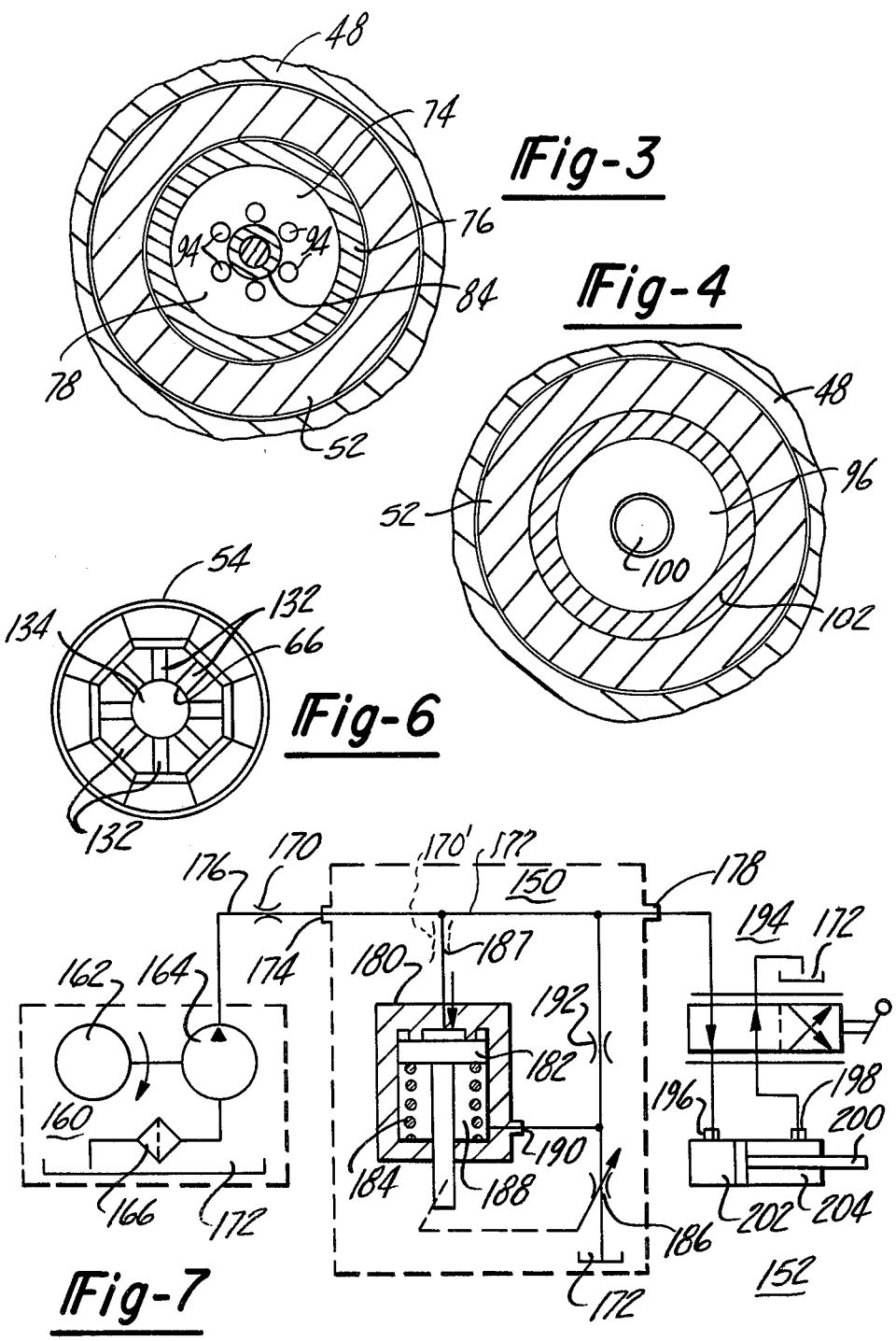

FLOW CONTROLLED PRESSURE REGULATING DEVICE

BACKGROUND AND SUMMARY OF THE INVENTION

Field of the Invention

The invention relates to an apparatus for regulating the delivery pressure and velocity of a fluid in hydraulic and pneumatic systems. One embodiment relates to a spray tip of a fuel injector that regulates the fluid pressure therein and the velocity of the fluid delivered to the combustion chamber of an internal combustion engine including diesel engines.

A characteristic of fuel injectors and nozzles or spray tips for such injectors is that the fuel injection pressure varies with engine speed and fuel delivery rate. (The terms nozzle and spray tip are used interchangeably herein.) This variation in injection pressure causes poor combustion which results in exhaust smoke, undesirable emissions, premature detonation and a reduction in fuel economy. Diesel injectors have utilized spring-loaded valves of a known type which prevent back-flow of combustion chamber gas into the injector body. Some injectors have incorporated a secondary check valve to prevent gas back-flow. Injectors are often designed to deliver a fixed quantity or charge of fuel to the engine. In an attempt to achieve proper penetration of the fuel into the surrounding combustion chamber it is desirable to inject fuel therein at a relatively constant fluid or fuel flow rate at all engine speeds. At many speeds including the lowest engine speed at which normal injector action is expected, the flow rate during fuel injection is such that the pressure drop across the injection orifice is above the pressure needed to fully open the spring-loaded control valve. Under these conditions, when flow starts, the pressure within the nozzle builds up to the value required to crack the valve i.e. to start valve opening, and usually overshoots due to the time required for the spring-loaded valve to open. At higher speeds, most injection systems produce a higher flow rate through these orifices, consequently injection is at a higher pressure drop and, therefore, at a higher velocity or flow rate therein causing the fuel to impinge upon the cylinder walls.

Flow rate and flow duration are often arbitrarily imposed by a pumping mechanism. This is generally true whether the pump is part of the injector such as in a unit injector, or a cam-driven pump having a shaped cam, or a centrally located pump that is feeding a number of devices. If a constant-speed pump is used, it is not only complicated, but it becomes difficult to inject a sufficiently small amount of fuel at the lowest engine speed, i.e., no load. A further source of flow rate variation stems from the fact that in some applications it is required to vary the injection flow rate during injection (by appropriate control of the pumping mechanism), while attempting to hold the outflow velocity nearly constant. There is, therefore, a perceived need for a nozzle which will allow injection at approximately constant pressure and velocity at variable input fluid flow rates.

The requirements imposed by constant pressure-variable pump flow inherently require a variable area injection orifice(s). To achieve a nearly constant pressure/-velocity-nozzle the pressure drop from the pump mechanism to the combustion chamber must occur primarily at the orifice which opens into the combustion chamber. To insure proper injector and engine operation the nozzle or spray tip must close rapidly at the end of each pumping interval to prevent any appreciable flow of low-pressure fuel into the combustion chamber and to prevent back-flow of pressurized gases into the nozzle. Prior art devices contain further drawbacks. In principle, one can design a spring-loaded device to function over a specified range of speed and pressures for a specified range of fluid flow. In practice, one finds that many mechanical devices have an internal resonance at about 30 Hz. This resonance is closely tied to the materials used and allowable material stress. These resonances can be shifted to a few hundred Hz by specification of spring rate and spring mass and by using good quality steel parts. However one cannot rely totally upon shifting the resonance by selection of materials and controlling mechanical tolerances to achieve a fast acting injector. In practice, the performance of prior art injectors are characterized by poor regulation, limited range, improper damping and display an increase in the injection pressure with increase in pump flow rate.

These deficiencies are corrected by the present invention by regulating the fuel pressure within a portion of the nozzle (spray tip) to control the velocity of the fluid exitting therefrom. It is therefore a broad objective of this invention to provide an improved fluid delivery device. More specifically it is an object of the invention to provide an improved fuel injector and injection nozzle to regulate the velocity of the fluid delivered to be independent of the quantity of flow therethrough and to regulate the pressure of the fluid within the nozzle. Another object of the present invention is to provide a fluid delivery device having a rapid opening and closing response. A further object of the invention is to provide a nozzle or spray tip that requires simple construction techniques to fabricate.

These and other objects of the invention are obtained by the present invention. The present invention includes a nozzle that is adapted to be in fluid communication with a source of fluid and a pumping mechanism that is capable of establishing a flow rate of fluid into the nozzle. As previously noted the pumping mechanism may be a centralized pump, a cam-driven pump located externally to the injector or incorporated within a housing that is common to the nozzle. In one embodiment the invention includes a housing that is adapted to receive pressurized fluid and a hollow lower body that is connected thereto in a known manner. A hollow spray tip (nozzle) is mounted within the lower body. The spray tip has a first end with a fuel receiving chamber that is located proximate thereto in fluid communication with the pressurized fuel. The spray tip further includes a lower end extending from the housing having at least one outlet orifice therein. The lower body further includes a plurality of concentric bores adapted to mate with a portion of the exterior of the spray tip (nozzle) having means to secure the spray tip therein. The spray tip further includes a reciprocally mounted cup-shaped piston that may include a bottom and sidewalls. The piston is slidably mounted within the spray tip with the sidewalls directed towards the exposed end of the spray tip. The bottom of the piston is operatively connected to a stem or plunger, which extends through the cup. The bottom of the piston further includes a determinable number of control orifices to create a pressure drop thereacross. The stem in turn is connected to a variable area orifice means for establishing a variable area outlet orifice and for permitting flow therethrough. In one embodiment of the invention the variable area orifice means includes a pressure operated conically shaped poppet valve operatively connected to the stem and sized to selectively seal a centrally located outlet bore. In another embodiment the variable area orifice means includes a plurality of discrete orifices located proximate the lower end of the spray tip; the open area of these orifices are controllably modulated by the movement of a plunger. The outlet orifices are maintained closed during low fluid flow periods by biasing the piston with a spring that is received within its cup-shaped interior.

A third embodiment of the invention incorporates the pressure regulating features of the spray tip into a by-pass pressure regulator which may be used as an element of a hydraulic or pneumatic system. More particularly, the third embodiment illustrates a by-pass hydraulic pressure regulator comprising a pressure chamber having a reciprocally mounted piston therein which is operatively connected to a variable area orifice.

One advantage of the present invention is the rapid closure response achieved. During injecting periods the cup-like piston operates to store a quantity of fluid at the regulated pressure, however, during non-injecting periods the pressure of the fluid outside the piston will have dropped below the regulated pressure level by the periodic operation of the pumping mechanism. Consequently, this entrapped or stored volume of fluid develops a force proportional to pressure difference across the orifices through piston multipled by the area of the bottom of the piston and supplements the restoring force applied by the spring to the reciprocatively mounted piston to rapidly terminate injection.

Another feature of the present invention, implemented either as a nozzle or as a by-pass pressure regulator, is the incorporation of a series orifice between the source of fluid and the movable piston. An advantage of incorporating the upstream series orifice within the system is that the stability of the system is increased because of the fluid feedback force generated in proportion to the rate of the piston movement. In addition the upstream series orifice isolates the piston from unwanted pressure surges. Many other objects, features, and advantages of the invention will become clear from the detailed description of the drawings.

BRIEF DESCRIPTION OF THE DRAWINGS

In the drawings:

FIG. 1 is a schematic diagram of a nozzle or spray tip incorporating the present invention.

FIG. 2 is a detailed cross-sectional view of the spray tip illustrated in FIG. 1.

FIG. 3 is a cross-section taken through section 3—3 of FIG. 2 illustrating the control orifice of the present invention.

FIG. 4 is a sectional view taken through section 4—4 of the present invention further illustrating the series orifices.

FIG. 5 is a sectional view of an alternate embodiment of the spray tip.

FIG. 6 is a sectional view taken through section 6—6 of FIG. 5 illustrating the relationship of the discrete output orifices to the outlet bore.

FIG. 7 illustrates an alternate embodiment of the present invention in particular an embodiment adapted to function as a by-pass pressure regulator.

DETAILED DESCRIPTION OF DRAWINGS

Reference is now made to FIG. 1 which shows a schematic diagram of a fluid delivery device such as a fuel injector 30 which may be adapted to deliver fuel to one of the cylinders of an internal combustion engine 33. The fuel injector 30 comprises a pumping means 32 to generate pressurized fluid by pumping fluid from fluid source 35 (tank). The pumping means 32 is capable of delivering fluid at a determinable flow rate to a chamber 34 proximate the nozzle or spray tip 50. The spray tip 50 may be modified in a known manner to be received into the combustion chambers of the engine.

Reference is now made to FIG. 2 which illustrates a detailed cross-section of the spray tip 50 of FIG. 1. There is shown a hollow nut 40 having a tapered bore 42 therein that terminates at open end 46. The bore 42 is sized to receive the spray tip 50 and further includes a medial circumferential shoulder 44 located above the open end 46. The other end 48 of nut 40 is adapted to mate within a portion of the pump means 32 in a known manner.

The hollow spray tip 50 comprises an upper cylindrical portion 52 and a lower cylindrical portion 54. The exterior of the spray tip 50 is fabricated to be in form-fitting engagement with the interior of tapered bore 42 and to rest upon shoulder 44. The spray tip 50 may be fabricated with a plurality of interior bores such as an upper bore 58 and a smaller middle bore 62; the transition surface therebetween forming a shoulder 60. The spray tip 50 also contains a lower bore 64 having a smaller dimension than the middle bore 62. The lower bore 64 terminates in an outlet bore 66, which may contain a single variable area orifice 88 as shown in FIG. 2 or a plurality of passages or discrete orifices as shown in FIG. 5.

A slidable piston 72 is mounted within the hollow spray tip 50. The piston 72 includes a cup-shaped member having a bottom 74 and a circumferential wall 76 extending therefrom. The wall 76 is slidably received in bore 58. The bottom 74 and circumferential wall 76 form a cavity 78 to receive spring 82. The spring 82 is sized to rest upon shoulder 63 while simultaneously engaging the bottom 74 of the piston 72 therein maintaining the piston 72, during periods of low flow, in a biased position apart from shoulder 60. It can be seen from FIG. 2 that shoulder 60 provides a motion stop for halting the motion of the reciprocatively mounted piston 72. The bottom 74 of piston 72 further contains an up-raised boss 84 which extends into the cavity 78. The up-raised boss 84 is adapted to receive a stem and valve assembly comprising a plunger or stem 86 which is loosely and slidably received within the lower bore 64 and a variable area orifice 88. In the embodiment of FIG. 2 the variable area orifice 88 is achieved by using a conically shaped poppet valve 110 designed to mate or seat with a conforming seat 112 which is formed in the outlet bore. FIG. 5 illustrates another embodiment of the variable area orifice 88. The volume between stem 86 and the lower bore 64 forms a fluid passage 90 for communicating fuel to the variable area orifice 88. Reference is once again made to the piston 72. It can be seen from FIG. 2 that the bottom 74 includes at least one control orifice 94. FIG. 3 is an isolated view of only the bottom 74 taken through section 3—3 and more clearly illustrates the relationship of the control orifices 94 to the bottom 74. The control orifices 94 are sized to create a determinable pressure drop across the bottom 74 of the piston 72. The embodiment shown in FIG. 2 has inherently a very short-stroke. Accordingly, spring rate is relatively unimportant. The spring 82 is sized to provide the proper pre-load to control the cracking pressure. Thereafter, the opening achieved is a function of both flow rate and pressure. It was found by computer simulation that desirable characteristics resulted if at maximum flow rate about half of the force needed to hold the nozzle open is provided by flow rate effects and about half by pressure, whereas at cracking (initiation of flow), virtually the entire force is due to static pressure. (There is some flow effect due to fluid entering chamber 78 via orifice(s) 94 to raise the pressure therein. It is noted that at the usual injection pressures diesel fuel is significantly compressible).

The nozzle 50 further includes an orifice plate 96 having a single series orifice 100 therein and located in fluid communication with the fuel receiving chamber 34. The orifice plate 96 is tightly received within an orifice plate holder 102 which is similarly tightly received within bore 58 of the upper body 52. The orifice plate holder 102 as illustrated in FIGS. 2 and 4 includes a passage 104 to communicate fluid from the orifice 100 through to the piston 72. In addition to holding the orifice plate 96, the orifice plate holder 102 serves as a piston retainer and motion stop and further serves to separate the orifice plate 96 from piston 72. As further illustrated in FIG. 2, the poppet valve 110 and stem 86 are maintained centrally located with respect to the valve seat 112 by a guide bushing 114. The above recited components are held together axially in a known manner.

This embodiment of the invention relies upon the fact that as the conically shaped poppet valve 110 moves away from seat 112 a variable area outlet orifice is created. This orifice comprises the area normal to the surface of the inverted frustum of the cone as measured from the inner corner of the seat 112 normal to the conical surface of the poppet valve 110. It can be seen that as the stem 86 and valve 110 move within the spray tip 50 a variable area orifice is created which results in a rapid decrease in area at injection pressure causing the spray tip 50 to operate as if it had a very high spring rate. As an example of this high spring rate consider the following: The pressure within the spray tip 50 would have to double in order to move the valve 110 from a barely open position to its full open position, hence, this sharply rising force is equivalent to a higher spring rate while not requiring a large mechanical spring and improves the force available for rapid closure of the valve 110 when fluid flow stops. By appropriately sizing the orifices 94 the flow through these holes creates a small pressure drop between the upper and lower surfaces of the bottom 74 of the piston 72. As can be seen from FIG. 2 the cup shaped piston 72 is necessarily large to receive a return spring 82 having adequate preload and stroke characteristics. Consequently, the large piston area multiplied by the small delta pressure can be chosen to provide a force which will hold the valve 110 at the desired open area for a given flow rate, at a selected injection pressure.

In operation the poppet valve 110, during noninjecting periods is urged against its seat 112 by the spring 82 which is preloaded against the piston 72 therein creating a fluid tight seal at the outlet bore 66. As the pressure within the nozzle 50 is increased the fluid bears upon the inward side of the poppet valve 110 and stem 86 until at some predetermined pressure the poppet valve 110 is forced from its seat 112. As the valve 110 is moved from its seat 112 fluid flow begins through the variable area outlet orifice 88 created. As previously mentioned it can be shown that the orifice 88 is the surface of an inverted frustrum of a cone measured from the innermost corner of the valve seat 112 normal to the conical surface of valve 110. The outward movement of the valve 110 results in a rapid decrease in outflow area at the designed (injection) pressure. The effect of this rapid decrease in area, as previously mentioned, is equivalent to using a spring 82 having a very high spring rate. It should be appreciated that this equivalent force due to orifice 88 area variation improves the force available for rapid closure when fluid flow stops and when the pressure within the spray tip 50 drops. As the fluid is ejected from orifice 88, a similar quantity of fluid enters the nozzle 50 through the series orifice 100. This fluid flows through the control orifice 94 in the piston 72 causing a pressure drop thereacross. The differential pressure so created is proportional to the square of the flow rate and applies a force upon the actuating piston 72 in a direction so as to modulate the annular outflow area of orifice 88 as a function of the input flow rate rather than as a function of the input pressure. This outflow area modulation even though somewhat nonlinear with stroke, tends to hold the upstream pressures relatively constant and thus cause the outflow fluid velocity to remain relatively constant. Linearity can be improved if the spring 82 is constructed to have a nonlinear spring constant, that is, using a spring having an decreasing spring rate with increasing stroke. The stability of the device is further enhanced through the cooperation of the series orifice 100 and the piston 72. As the cup-shaped piston 72 moves away from orifice 100 the cavity 106 therebetween increases. The pumping mechanism 32 will continue to fill this cavity 106 as the piston 72 continues to move down. During this motion a rate feedback force is generated opposing the motion of the piston 72. More specifically as the piston 72 moves away from orifice 100 the fluid pressure within the piston 72 increases and the fluid pressure within the cavity 106 decreases. During periods when the piston 72 is moving toward the orifice 100 the direction of this rate feedback force will reverse. The magnitude of this rate opposing force can be controlled by appropriately sizing the series orifice 100. Additional rate feedback is provided because of the viscous drag between the exterior walls of the piston 72 and bore 58.

Prior to the termination of injection the flow rate of received fluid will go negative (perhaps being dumped to a drain) as all pumping mechanisms do as a means of ending injection. During this interval the pressurized volume of fluid upstream of the piston 72 will depressurize via orifices 94 and 100. As this happens fluid closing forces are generated to supplement the restoring force imparted by spring 82. The valve 110 will similarly exhibit rapid closure if the pump flow goes to zero rather than negative if the control orifices 94 are relatively large. Good design principles require that (a) the valve 110, seat 112 and stem 86 diameter be sized within permissible stem stress levels, adequate flow area at maximum stroke and an adequate reduction of pressurized area as a function of stroke, (b) the control orifices 94 should be sized to permit the desired flow at a selected pressure condition, (c) the series orifice 100 should be sized for the desired transient performance of the piston 72 and (d) it may be advantageous to select the volume of cavity 106 to be smaller than the volume below the piston 72.

Reference is made to FIG. 5 which illustrates an alternate embodiment of the present invention. More particularly there is illustrated a nozzle or spray tip 130 for a fuel injector. This embodiment of the invention utilizes an enclosed inward opening spray tip having any number of discrete outflow orifices 132. As used herein "inward" denotes motion of the valving mechanism of the spray tip into the cylinder. A comparison of FIGS. 5 and 2 illustrate a commonality between the various parts of the lower body 40 which cradle or hold the spray nozzles 50 and 130. These parts will be referred to by the same reference numeral. The bottom 74 of piston 72 is similarly fabricated with a member such as the upraised boss 84 that is adapted to receive one end of a plunger or stem 86. The plunger 86 is loosely received within the lower cylindrical portion 54 therein establishing a fluid passage between the plunger 86 and the lower bore 64. The other end of the plunger 86 comprises a pintle 134 that is sized to be slidably received within the outer bore 66. The pintle 134 is further sized to cooperate with the discrete outflow orifices 132 so that a determinable open area of the orifice 132 is achieved in correspondence with the motion of piston 72. The relationship between the discrete outflow orifices 132 and the pintle 134 is shown in FIG. 6. The piston further includes at least one control orifice 94 located within the bottom 74 of piston 72. The nozzle 130 further includes a piston retainer 136 having located therein the single series orifice 100 which is maintained in spaced apart relationship relative to the piston 72. The piston retainer 136 further includes a shoulder or rimmed portion 138 which serves to space the piston 72 from the orifice 100 and is further sized to provide a relatively small volume 140 therebetween. The series orifice 100 may be replaced by a suitable plurality of orifices or a laminar flow restrictor. It should be recalled that the embodiment illustrated in FIG. 2 utilized the relationship between the variable outflow area orifice to obtain a sharply rising force that is equivalent to a high spring rate. If the spring 82 is sized to have a sufficiently high spring rate, this increased spring rate could substitute for the variability in the pressurized area of the outflow orifice. It should be apparent, that this is the starting point for this alternate embodiment. This is possible in the embodiment shown in FIG. 5 because the injection orifice(s) 132 can be designed to require a relatively long stroke (perhaps 0.010 to 0.020 inches) to achieve the area needed for maximum flow at the desired achieve the area needed for maximum flow at the desired injection pressure, thus making spring rate a substantial factor in computing the force acting on the movable element. In this embodiment the control orifices 94 are selected in conjunction with the rate of spring 82 so that the relationship between pressure (without flow) required to open the outflow orifices 132 to the outflow area required at maximum design flow at maximum design pressure is about twice the design pressure. In addition the control orifices 94 are sized so that at the designed fluid flow the pressure within the piston 72 is the design pressure and the pressure within the volume 140 is sufficiently above the design pressure to yield the required force to hold the piston 72 and plunger 86 in a position which opens the outflow orifices 132. It should be appreciated that the pressure drop across the bottom of the piston 72 is relatively small; this is because the diameter of the piston is necessarily much larger than the cross-sectional area of the pintle 134. This is true since piston 72 is chosen to accommodate a practically sized spring 82 and to allow room for flow between the inside of spring 82 and the plunger 86 connecting the piston 72 and the pintle 134. The operation of the nozzle shown in FIG. 5 is substantially equivalent to the operation of nozzle 50. If the nozzle 130 is incorporated within a fuel injector of an internal combustion engine, then in synchronism with the combustion process therein the pressure upstream of the spray tip 130 is made to increase in a known manner. As the pressure immediately upstream of the spray tip, i.e. immediately upstream of the series orifice 100, increases the fluid pressure within the spray tip 130 bears upon the inward side of the plunger 86. Those skilled in the art will appreciate that fluid pressurization need not be accomplished internal to the injector but may be achieved in conjunction with an external pump of a known variety. The pressure force of the fluid has a value given by the magnitude of the fluid pressure times the cross sectional area of plunger 86 and bears on the portion 142 of the plunger in opposition to the spring bias force therein moving the plunger 86 from its biased position. As the plunger 86 moves toward the combustion chamber of the engine, the undercut portion 142 will uncover a portion of the outlet orifices 132 causing fluid to flow from the spray tip 130. The flow path of fuel from the fuel chamber 34 into the spray tip is readily discernable from FIG. 5. The fuel flowing through the control orifices 94 of the piston 72 causes a pressure drop thereacross. The differential pressure so created is proportional to the square of the flow rate Q and causes a force to be applied to the bottom 74 of the piston 72 thereby modulating the open area of the outlet orifices 132 as a function of the flow rate of the fuel therethrough in addition to the pressure of the fuel. In operation, the modulation of the open area of the outlet orifices 132 even though somewhat nonlinear with the stroke of the piston tends to maintain the upstream pressure within the injector relatively constant causing the velocity of the fluid ejected from the spray tip 50 to be ejected at a relatively constant outflow velocity V. Linearity, that is the relation between the pressure drop across the control orifices 94 divided by the square of the flow rate $Q^2$ can be improved if the spring 82 is fabricated having a nonlinear spring rate.

The invention displays the advantages of fast response coupled with excellent stability. The stability of the system is enhanced by the series orifice 100 which is located within the piston retainer 136. The series orifice 100 tends to limit destabilizing input pressure transients as well as generating a stabilizing feedback force. In addition, stability of the present invention is further enhanced by ensuring the natural frequency of the spring-mass system, formed by piston 86 and plunger spring 82, is as high as possible. It can be appreciated that because of the low mass of the plunger stem and piston combination the injector will display a rapid opening time, however, the injector also displays an extremely rapid closing time. While the piston 72 is modulating the outlet area of the orifices 132 in accordance with the outlet flow, the volume of fuel located within the spray tip nozzle 50 is maintained at a regulated pressure. During non-injecting periods the input pressure is relieved in a known manner to a level below the level of the regulated pressure. In response to this pressure differential the piston 72 will be rapidly urged towards the piston retainer 136 thereby closing the outlet orifices 132. It can be seen that by balancing the outflow area of the outlet orifices 132, the surface area of the bottom 74 of the piston 72, the area of the control orifices 94 and the spring rate of the spring 82, the outlet area of the orifices 132 can be modulated in accordance with the teachings herein.

Reference is made to FIG. 7 which illustrates another embodiment of the present invention. FIG. 7 is a schematic diagram of a by-pass pressure regulator 150 which is used to control the pressure to a hydraulic cylinder 152. With minor modifications the regulator 150 is suitable for pneumatic systems as well. More particularly, there is shown a hydraulic power supply 160 of a known variety which contains a drive motor 162, a rotary pump 164 and a filter 166 which supplies hydraulic fluid to a series orifice 170 from a reservoir 172 through conduit 176. The reservoir 172 is common to a number of the primary components of the hydraulic system. A vent would be substituted for reservoir 172 in pneumatic systems. The series orifice 170 is connected to an inlet 174 of the by-pass pressure regulator 150. The by-pass pressure regulator 150 further includes a housing 180 having a pressure chamber 188 and a reciprocating piston 182 situated therein. Piston 182 is maintained, during low flow conditions, in a biased position within the housing by a spring 184. The piston is mechanically connected (shown as a dotted line) to a variable area orifice 186 and hydraulically linked to the incoming fluid through line 187. The output of orifice 186 is connected to reservoir 172 while the input of orifice 186 is connected in common fluid communication to port 190 and to one side of control orifice 192. The input to orifice 192 is connected to the inlet 174 using suitable and well known connectors and hydraulic lines 177. In addition, the inlet port 174 and orifice 192 are connected through outlet 178, to a control valve 194 such as a four-way control valve. Hydraulic fluid is directed to either port 196 or 198 of the hydraulic piston 152 in accordance with the position of control valve 194. The control valve 194 is also connected to the reservoir 172. A comparison of the by-pass pressure regulator 150 of FIG. 7 to the spray tip of FIGS. 2 or 5 will illustrate the similarity of these embodiments. More particularly, it can be seen that there is a similarity between the function of the series orifice 170 of the by-pass pressure regulator and the series orifice 100. In a similar fashion it can be seen that the function performed by the control orifices 94 is similarly performed by the control orifice 192. While the embodiment of the pressure regulator 150 requires the use of a variable area outlet orifice 186, it should be appreciated that the combination of the outlet orifices 132 and plunger 86 cooperate to achieve a variable area outlet orifice not unlike orifice 186. The operation of the hydraulic system illustrated in FIG. 7 follows:

In a quiescent flow situation i.e., where no fluid is demanded by either the control valve 194 or the hydraulic cylinder 152 fluid at a pressure determined by the characteristics of the hydraulic power supply 160 will bear upon the piston 182 in the direction of the arrow. This force causes the piston 182 to move against the preload established by the spring 184. The motion of the piston 182 in turn causes the variable area outlet orifice 186 to open slightly. Flow through the control orifice 192 will cause a differential pressure to occur across the piston 182 therein urging it downward against spring 184 until the variable area outlet orifice 186 is fully opened. In this condition, all of the fluid from the hydraulic power supply 160 will be by-passed into the reservoir 172. It should be noted that as illustrated in FIG. 7 the piston is in a midrange position. As piston 200 moves within the hydraulic cylinder 152 it defines two variable volume regions 202 and 204. Assume that piston 200 which is slidably disposed within the hydraulic cylinder 152 is at the left most portion of its stroke. If hydraulic fluid is needed to move piston 200 out of the hydraulic cylinder 152 the control valve 194 is manipulated into a position wherein fluid is input to port 196. The fluid flowing into port 196 fills volume 202 therein pushing piston 200 to the right. During this dynamic condition, the total fluid flow is proportioned between the hydraulic cylinder 152, the housing 180 and the series combination of the control orifice 192 and the variable area outlet orifice 186. The reduced flow through the control orifice 192 during these dynamic conditions causes a reduction in the differential pressure across the piston 182. This reduced differential pressure in combination with the spring bias force applied by spring 184 causes the piston 182 to seek a new equilibrium position within housing 180 therein modifying the initial position of the variable outlet area orifice 182. This change or modulation in the outlet area of orifice 186 in response to flow demands by the hydraulic cylinder 152 causes the pressure within the hydraulic system to remain at a regulated level.

It should be appreciated that it is not necessary to implement the hydraulic system as shown in FIG. 7 with a discrete series orifice 170. The required pressure drop across the series orifice 170 can be achieved by sizing the dimensions of line 176 to achieve a specified amount of upstream hydraulic pressure loss. Alternatively orifice 170 may be situated within line 187. The alternate placement of the orifice 170 is shown in phantom lines and designated as 170'. In addition the control orifice 192 and the variable area orifice 186 may be implemented as separate and distinct units outside the regulator housing or they may be integrated internally within the housing in a fashion similar to the components of the pressure regulating injector of FIG. 2 or 5.

Returning briefly to the operation of the hydraulic cylinder 152 the piston will continue to travel from left to right until flow is cut off by the operation of the control valve 194 or until the piston achieves its maximum stroke. If it is desirable to have the piston 200 move into the hydraulic cylinder 152, control valve 194 is manipulated to permit the pressurized fluid to flow into the second port 198 whereupon the port 196 is connected to the reservoir 172. In this condition, the piston 200, in response to the pressure differential created thereacross will move from right to left. Those skilled in the art will appreciate that the by-pass pressure regulator may be incorporated within pneumatic systems as well; in these systems a vent may be substituted for reservoir 172.

Changes and modifications in the specifically described embodiments can be carried out without parting from the scope of the invention which is intended to be limited only by the scope of the appended claims.

What is claimed is:

1. An apparatus for delivering fluid, the apparatus being adapted to receive fluid from a pump means, wherein the pump means has means for delivering fluid at a determinable flow rate, the apparatus comprising:

fluid receiving means for receiving the delivered fluid;

spray tip means in fluid communication with said fluid receiving means comprising:

a hollow body having a fluid passage therethrough;

valve means for selectively opening and closing said fluid passage and for establishing a variable area orifice therein;

pressure regulating means comprising piston means reciprocatively mounted within said body and having at least one control orifice therein, for moving said valve means and for modulating the area of said variable area orifice to regulate the fluid pressure within said passage at a relatively constant value and for regulating the velocity of the fluid flowing from said variable area orifice independent of the quantity of flow therethrough.

2. The apparatus as recited in claim 1 further including first means in fluid communication with said fluid receiving means for developing a pressure drop thereacross in proportion to rate of fluid flow therethrough and for developing a feedback force on said piston means that is proportional to the rate of motion of said piston means.

3. The apparatus as recited in claim 2 wherein said first means includes at least one orifice located upstream of said piston means.

4. The apparatus as recited in claims 2 or 3 wherein said piston means comprises a movable member, spaced apart from said first means, reciprocatively mounted within said body and connected to said valve means wherein said movable member contains at least one control orifice therethrough.

5. The apparatus as recited in claim 4 wherein said piston means further includes biasing means for urging said valve means to inhibit fluid flow during operating intervals involving low rates of flow.

6. The apparatus as recited in claim 5 wherein said movable member includes a cup-shaped member sized to receive said biasing means, and wherein said cup-shaped member includes a bottom having at least one control orifice located therethrough.

7. The apparatus as recited in claim 6 wherein said biasing means is a helical spring.

8. The apparatus as recited in claim 6 wherein said valve means is a conical poppet valve and wherein an end of said body forms a coacting conically shaped valve seat for generating a rapid decrease in outflow area as a function of the stroke of said poppet valve.

9. The apparatus as recited in claim 6 wherein said body contains a plurality of discrete outflow orifices in fluid communication with said fluid passage and wherein said valve means comprises a pintle means reciprocatively located within said fluid passage for modulating the open area of said plurality of discrete outflow orifices in correspondence with the motion of said piston means.

10. The apparatus as recited in claim 1 wherein said valve means comprises an outlet orifice means having a determinable outlet area that varies rapidly with stroke, means for varying said determinable outlet area in accordance with the motion of said piston means and wherein said piston means varies the area of said outlet orifice means in proportion to the square of the rate of fluid flow through said control orifice.

11. The apparatus as recited in claim 1 or 10 further including damping means located upstream of said piston means for generating a pressure drop thereacross for damping the motion of said piston means.

12. The nozzle as recited in claim 11 wherein said piston means comprises:

a member having a bottom with at least one control orifice therein and a cylindrical sidewall extending from said bottom, said member situated within said passage so that said sidewall extends in the direction of said valve means;

biasing means engaging said member for biasing said member in a direction to cause said valve means to close said passage during non-injecting periods.

13. The apparatus as recited in claim 12 where said biasing means comprises a spring having a non-linear spring constant for further regulating the pressure within said passage at a relative constant value.

14. The nozzle as recited in claim 12 wherein:

said body includes proximate said valve means a conically shaped valve seat and where said valve means comprises a conically shaped valve conforming to the shape of said valve seat for generating a flow area defined between said valve means and said valve seat that rapidly decreases as a function of the stroke of said valve means and a stem operatively connecting said valve with said member.

15. The apparatus as recited in claim 12 wherein said body comprises at least one outlet orifice located proximate said valve means; and where said valve means comprises:

pintle means reciprocally mounted within said passage for selectively uncovering a portion of said at least one outlet orifice in correspondence with the motion of said member.

16. The apparatus as recited in claim 11 wherein said damping means comprises a member inserted within said passage forming a fluid tight seal therebetween and maintained in spaced apart relation relative to said piston means and having orifice means therethrough for providing a pressure drop thereacross and for communicating fluid from said receiving means to said piston means.

17. A fuel injector having injecting and non-operating modes of operation for supplying fuel to an internal combustion engine in timed relationship to the combustion process therein, comprising:

an upper body having fuel receiving means defining a fuel chamber for receiving a determinable quantity of pressurized fuel prior to the time of said injecting mode;

a lower body connected to said upper body including a nut having a tapered bore and having a first shoulder therein;

a hollow spray tip inserted within and extending from said tapered bore, said spray tip mounted in form fitting engagement with the internal portions of said tapered bore, said spray tip having an upper bore, and further having an outlet bore located within that portion of said spray tip extending from said lower body, said spray tip further including variable area orifice means in fluid communication with said outlet bore for permitting a controlled quantity of fluid to flow therefrom;

a piston responsive to said pressurized fluid for regulating the downstream fluid pressure at a relatively constant value comprising a cup-like member including a bottom located proximate to and spaced apart from said fuel chamber having at least one control orifice therein for receiving said pressurized fuel, said bottom extending into and reciprocally engaging said upper bore, spring means located within said spray tip engaging said member for biasing said piston during the non-injecting mode toward said upper body;

a stem movably mounted within said spray tip having a first end connected to said bottom and having a second end, slidably mounted within said outlet bore having first means for controllably opening said orifice means in correspondence with the reciprocal motion of said piston.

18. The fuel injector as recited in claim 17 further including piston retainer means interposing said bottom of said piston and said fuel chamber for providing a fuel receiving cavity adjacent said bottom and having damping means for damping the motion of said piston by generating a pressure drop thereacross in proportion to the motion of said piston.

19. The fuel injector as recited in claim 18, wherein said damping means comprises at least one series orifice located within said retainer means.

20. The fuel injector as recited in claim 19 wherein said spring means includes a spring having a spring constant that has a spring rate that decreases with increasing stroke to further regulate said downstream fluid pressure.

21. A fuel injector adapted to supply fuel to an internal combustion engine in timed relation to the combustion process therein comprising:

housing means adapted to receive fuel from a pressurized fuel source;

spray tip means mounted within and extending from said housing means in fluid communication with said received fuel for spraying said received fuel into the engine, said spray tip means further including orifice means located within said extending portion of said spray tip means for providing a passage having an open area for fuel to exit therefrom and plunger means for opening and closing said orifice means, said spray tip means further including pressure regulating means attached to said plunger means for modulating the open area of said orifice means during injecting periods to regulate the pressure immediately upstream of said orifice means at a relatively constant value and for regulating the velocity of fuel existing from said orifice means.

22. A fluid pressure regulator adapted to receive fluid from a fluid source and further adapted to deliver fluid at a controlled velocity and pressure to a fluid device, the pressure regulating comprising:

an inlet port;

an outlet port;

line means for providing fluid communication between said inlet and outlet ports;

a pressure chamber having an input port adapted to receive fluid from said line means and further having an exit port;

variable orifice means, having an inlet end in fluid communications with said exit port and said line means and having an exit end adapted to be in fluid communication with a reservoir, for controlling the pressure of the fluid upstream of said inlet end at determinable levels;

piston means reciprocally situated within said pressure chamber, and connected to said variable orifice means for pressurizing the fluid therein and for modulating the open area of said variable orifice means;

control orifice means connected to said line means, and to the junction of said exit port and said inlet and for establishing a pressure drop thereacross.

23. The pressure regulator as recited in claim 22 further including series orifices means situated upstream of said pressure chamber in fluid communication with said line means for causing a determinable pressure drop in the fluid from the fluid source.

24. The pressure regulator as recited in claim 23 further including series orifice means located between said line means and said pressure chamber for providing a determinable pressure drop thereacross.

25. The pressure regulator as recited in claim 23 further including series orifice means located upstream of said inlet port for providing a determinable pressure drop thereacross.

* * * * *